United States Patent
Butsuen et al.

[11] Patent Number: 5,598,337
[45] Date of Patent: Jan. 28, 1997

[54] SUSPENSION APPARATUS WITH DRIVING STATE FEEDBACK FOR VEHICLES

[75] Inventors: Tetsuro Butsuen, Hiroshima-ken; Yasunori Yamamoto, Higashihiroshima; Tohru Yoshioka, Hatsukaichi, all of Japan

[73] Assignee: Mazda Motor Corporation, Hiroshima, Japan

[21] Appl. No.: 495,872

[22] Filed: Jun. 28, 1995

Related U.S. Application Data

[63] Continuation of Ser. No. 127,365, Sep. 28, 1993, abandoned.

[30]     Foreign Application Priority Data

Sep. 30, 1992   [JP]   Japan ................................. 4-262239

[51] Int. Cl.$^6$ ............................................. G06F 7/70
[52] U.S. Cl. ........................ 364/424.046; 280/707; 280/714; 180/312; 180/902; 180/41
[58] Field of Search ..................... 364/424.05, 426.01, 364/508, 550; 280/707, 703, 840, 709, 714, 772; 188/299; 180/312, 902, 41; 73/669, 105

[56]             References Cited

U.S. PATENT DOCUMENTS

| | | | |
|---|---|---|---|
| Re. 34,628 | 6/1994 | Fujishiro et al. | 280/707 |
| 4,696,489 | 9/1987 | Fujishiro et al. | 280/707 |
| 4,749,210 | 6/1988 | Sugasawa | 280/707 |
| 4,770,438 | 9/1988 | Sugasawa et al. | 364/424.05 |
| 4,827,416 | 5/1989 | Kawagoe et al. | 364/424.05 |
| 4,949,262 | 8/1990 | Buma et al. | 364/424.05 |
| 4,967,359 | 10/1990 | Sugasawa et al. | 364/424.05 |
| 5,034,890 | 7/1991 | Sugasawa et al. | 364/424.05 |
| 5,071,159 | 12/1991 | Kamimura et al. | 280/707 |
| 5,075,855 | 12/1991 | Sugasawa et al. | 364/424.05 |
| 5,175,687 | 12/1992 | Tsutsumi et al. | 364/424.05 |
| 5,176,399 | 1/1993 | Takehara et al. | 280/707 |
| 5,203,584 | 4/1993 | Butsuen et al. | 364/424.05 |
| 5,239,471 | 8/1993 | Takahashi | 364/424.05 |
| 5,243,525 | 9/1993 | Tsutsumi et al. | 364/424.05 |
| 5,255,191 | 10/1993 | Fulks | 364/424.05 |
| 5,269,557 | 12/1993 | Butsuen et al. | 364/424.05 |
| 5,301,111 | 4/1994 | Utsui et al. | 364/424.05 |

FOREIGN PATENT DOCUMENTS 60-248419   12/1985   Japan .

*Primary Examiner*—Kevin J. Teska
*Assistant Examiner*—Jacques Louis-Jacques

[57]             ABSTRACT

A suspension control system for feedback-controlling the sprung mass acceleration signal $y_m$ and a method for introducing the unsprung mass acceleration signal $y_L$ into a tuning circuit to tune gain of an FIR filter. In this system, tuning is performed so as to cancel the road surface input $y_m$ close to a reference frequency (around 10–12 Hz). As a result, the sprung mass acts as a dynamic damper upon the road surface input $y_m$ close to the reference frequency (around 10–12 Hz), however, frequency bands other than the reference frequency band do not receive the contribution of the second term in the equation (6). That is, output from the tuning circuit to an adder becomes almost zero, and normal sky-hook control is performed. Though the sprung mass system acts as a dynamic damper, the unsprung mass system exceeds the sprung mass system in mass, and excessive resonance does not occur.

17 Claims, 9 Drawing Sheets

SUSPENSION APPARATUS WITH DRIVING STATE FEEDBACK FOR VEHICLES

This application is a continuation, of application Ser. No. 08/127,365, filed Sep. 28, 1993, now abandoned.

BACKGROUND OF THE INVENTION

1. Field of the Invention

The present invention relates to a vehicle suspension apparatus and, more particularly, to a suspension apparatus which effectively cancels a vibration input of a predetermined frequency input from a road surface.

2. Description of the Related Art

An active suspension apparatus has been proposed for improving driving stability and comfortability. Since the active suspension costs too much, instead of the active suspension, what is called a semi-active suspension apparatus has been proposed. In the semi-active suspension apparatus, a hydraulic device suppresses the displacement of posture of a vehicle body in a low-frequency band, and a shock absorber (damper) damps posture displacement in a high-frequency band.

Japanese Patent Application Laid-Open No. 60-248419 and Japanese Patent Application Laid-Open No. 3-72415 disclose a semi-active suspension apparatus comprising a shock absorber (damping device) between sprung mass on the vehicle body side and unsprung mass on the wheel side for damping vertical vibration of the wheels. The shock absorber has variations such as an absorber which changes, in a stepwise manner, a damping coefficient representing a damping force in two steps (large/small), an absorber which changes the damper coefficient in a multi-stepwise manner, and an absorber which changes the damper coefficient in a continuously-stepless manner.

The basic control method for the damper-coefficient variable shock absorber is as follows. The damper coefficient is changed so that damping force generated by the shock absorber becomes the target damper force (what is called "a sky-hook damper force") for preventing displacement of the sprung mass in a vertical direction. Japanese Patent Application Laid-Open No. 60-248419 discloses examining a positive/negative sign of the difference between the sprung mass position and the unsprung mass position and a positive/negative sign of the difference between the sprung mass velocity and the unsprung mass velocity to determine whether or not the signs coincide with each other. If the signs coincide with each other, the shock absorber damper coefficient is increased to raise the damper force; if not, the shock absorber damper coefficient is decreased to lower the damper force.

FIG. 1 shows frequency characteristics of an acceleration signal of the sprung/unsprung mass with respect to road surface input signals in the conventional semi-active suspension apparatus model.

In FIG. 1, a solid line indicates the frequency characteristic when the setting of the shock absorber is "hard"; a dot-dash line, the frequency characteristic when the setting is "soft"; a broken line, the frequency characteristic when the setting is "normal". As shown in FIG. 1, when the shock absorber setting is normal, an acceleration peak appears at around 4–7 Hz, and at this time, a driver feels "jolted". A peak at around 10–12 Hz causes the driver to feel "trembling" or "rattling". If the damping setting is soft, as represented by the dot-dash line the "jolted" and "trembling" feelings are augmented/increased. On the other hand, if the damping setting is hard, the acceleration characteristic exhibits high value from a low-frequency to a high-frequency with a peak at around 10–12 Hz, as represented by the solid line. Changes of acceleration do not appear in both the soft damping and normal settings but appear in the hard damping setting causing the driver to feel "vibrating".

To improve the suspension characteristics in all the frequency bands, hard-setting of the shock absorber damping with respect to a road surface vibration input in the low-frequency band (the hydraulic device is employed for the low-frequency input) and soft-setting of the damping with respect to a road surface vibration input in the high-frequency band (in consideration of the costs when the expensive full-active suspension is used for high-speed response to the high-frequency vibration) can be proposed. For example, in FIG. 1, the damping with respect to the frequency bands I and III may be set as "normal" and the damping with respect to the frequency band II may be set as "hard".

However, this arrangement cannot prevent comparatively high acceleration in the frequency band II, therefore, further prevention is needed. In addition, the phenomenon that the driver feels "trembling" with respect to the road surface vibration input in the 10–12 Hz frequency band also occurs in the full-active suspension apparatus as shown in FIG. 2.

Since a vibration input changes transitionally, prediction of such vibration inputs is difficult. For this reason, there has been no effective solution for the resonance with respect to a vibration input of a specific frequency band. Regardless of full-active suspension or semi-active suspension, the conventional suspension apparatuses have mainly performed feedback control, in which the hydraulic control and shock absorber control are made based on a transitionally variable road surface vibration. However, a time delay occurred in this feedback control rather induces resonance.

SUMMARY OF THE INVENTION

The present invention has been made in consideration of the above problems of the conventional apparatuses, and has as its object to provide a vehicle suspension apparatus which effectively cancels resonance caused by a road surface vibration input of a predetermined frequency band.

Another object of the present invention is to provide a suspension apparatus which performs feedforward control using a reference signal corresponding to a road surface vibration input which would induce resonance of unsprung mass but can effectively reduce the resonance.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings. In the embodiment, a shock absorber is capable of changing the damping characteristic in a multi-stepwise manner and is provided to each wheel.

System Configuration

Figure 3:
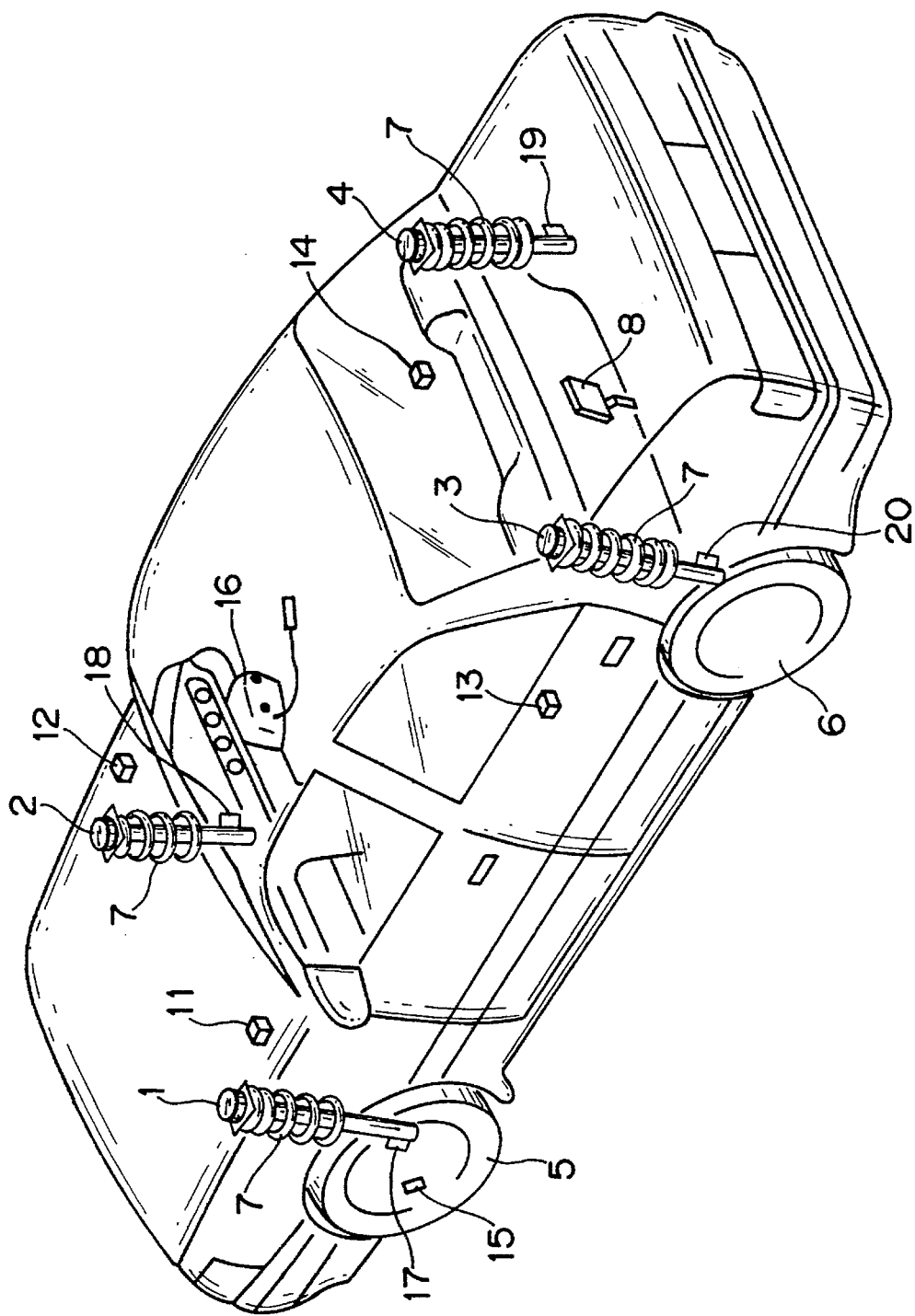
FIG. 3 is a perspective view of a vehicle to which an embodiment of the present invention is applied.

FIG. 3 shows a part layout of a vehicle comprising the suspension apparatus according to the present embodiment.

In FIG. 3, reference numerals 1 to 4 denote shock absorbers respectively provided to right and left front wheels 5 (only the left wheel is shown) and right and left rear wheels 6 (only the left wheel is shown), for damping vertical vibration of the wheels. The shock absorbers 1 to 4 respectively include an actuator (shown in FIGS. 4 and 5) for changing a damper coefficient to one of ten steps. Further, the shock absorbers 1 to 4 include a pressure sensor (not shown) for detecting an actual damping force value. Numeral 7 denotes a coil spring provided around the upper outer circumference of the respective shock absorbers 1 to 4; 8, a control unit for changing the damper coefficient of the actuators in the shock absorbers 1 to 4 by outputting a control signal to the actuators. The control unit 8 receives detection signals outputted from the pressure sensors in the shock absorbers 1 to 4.

Numerals 11 to 14 denote acceleration sensors for detecting acceleration $y_m$ in a vertical direction of the sprung mass at the respective wheels; 15, a vehicle speed sensor for detecting vehicle speed V from the rotational speed of the front wheel 5 as a following wheel; 16, a steering angle sensor for detecting a steering angle $\theta_s$ of the front wheel 5 from rotation of a steering shaft; 17 to 20, acceleration sensors for detecting $y_L$ of the unsprung mass at the respective wheels; 35, a yaw rate sensor for detecting a rotational speed $\phi$ of the vehicle body around a vertical axis (yaw rate).

Figure 4:
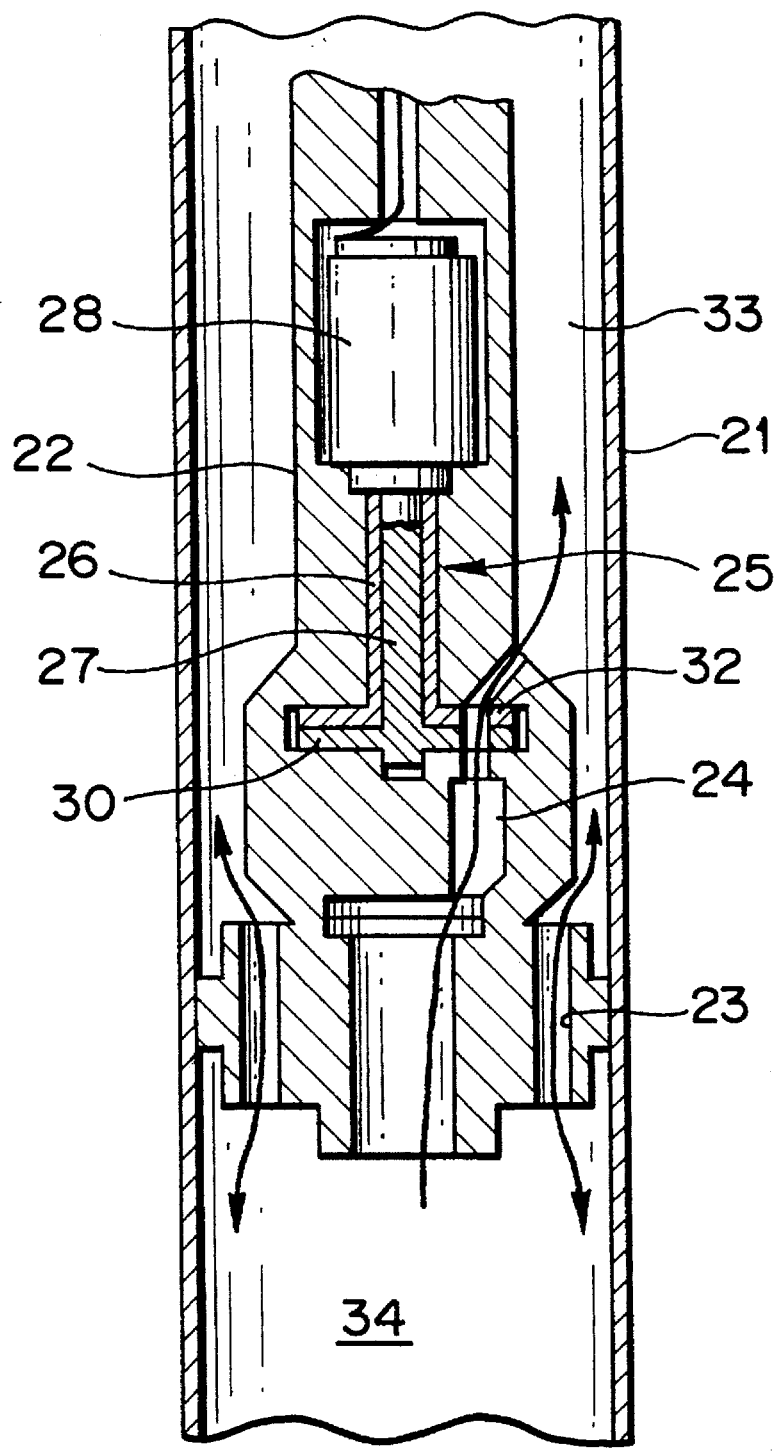
FIG. 4 is a cross-sectional view showing a shock absorber used in the vehicle in FIG. 3.

FIG. 4 shows the construction of the shock absorbers 1 to 4. In FIG. 4, the pressure sensor incorporated in the shock absorber is omitted for the sake of simplification.

In FIG. 4, reference numeral 21 denotes a cylinder in which a piston unit 22 integrally formed by a piston and a piston rod is slidably provided. The cylinder 21 and the piston unit 22 are respectively connected to the sprung mass and the unsprung mass via a connection construction.

Figure 5:
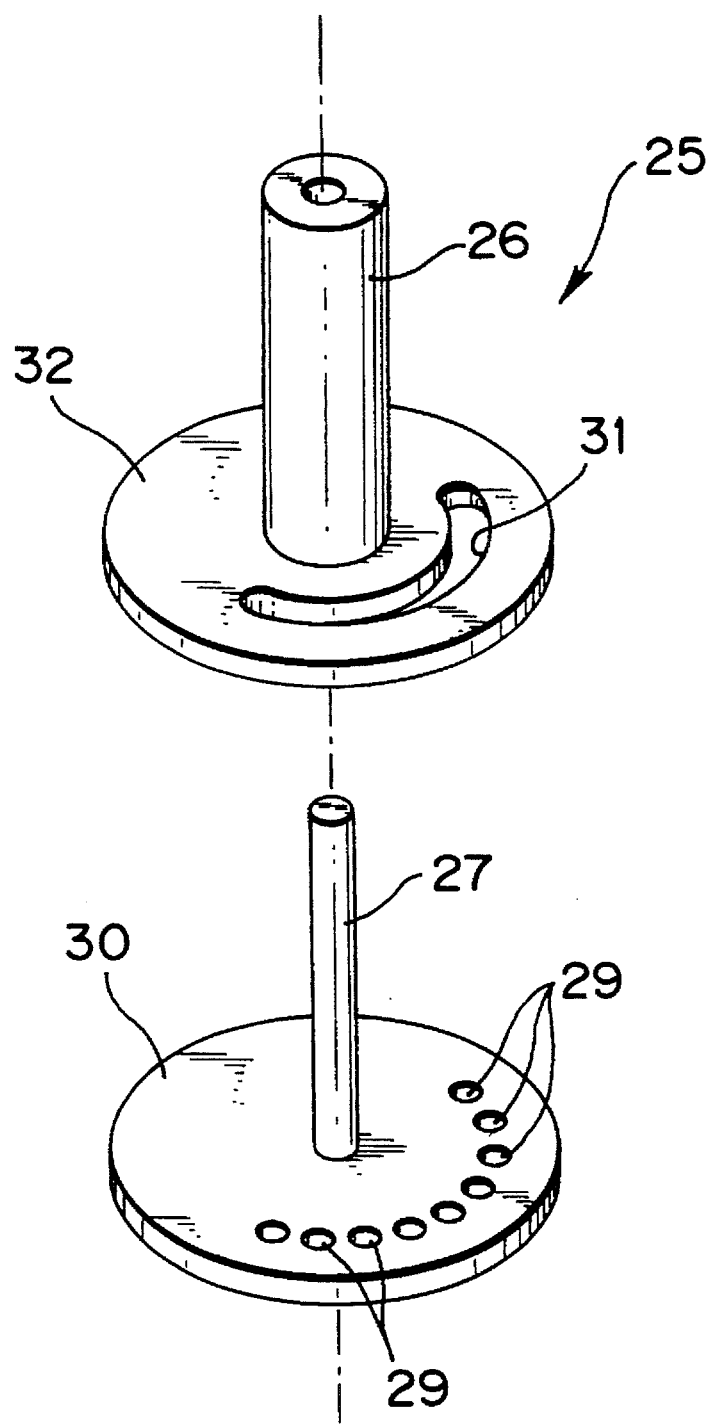
FIG. 5 is a perspective view for explaining the principle of changing damping force of the shock absorber in FIG. 4.

The piston unit 22 has two orifices 23 and 24. The orifice 23 is always open, and the opening area (aperture) of the orifice 24 is variable in ten steps by actuator 25. As shown in FIG. 5, the actuator 25 has sleeve 26 which is fixed within the piston unit 22, shaft 27 which extends through the sleeve 26 and which is rotatable in the sleeve 26, step motor 28 which rotates the shaft 27 by a predetermined angle, first orifice plate 30 having nine circular holes 29 at predetermined intervals in its circumferential direction, second orifice plate 32 having an elongate hole 31 along the circumferential direction. The first orifice place 30 is integrally and rotatably connected to the lower end of the shaft 27, and the second orifice plate 32 is attached to the lower end of the sleeve 26. As the step motor 28 starts and the first orifice plate 30 turns, the circular holes 29 of the first orifice plate 30 overlap with the elongate hole 31 of the second orifice plate 32 and do not overlap with the elongate hole 31. The number of the circular holes 29 which overlap with the elongate hole 31 sequentially changes from zero to nine.

The cylinder 21 has upper chamber 33 and lower chamber 34 filled with a fluid having appropriate viscosity. Hollow within the piston unit 22 connected to the upper and lower chambers 33 and 34 is also filled with the viscosious fluid. This fluid moves through either of the orifices 23 and 24 between the upper and lower chambers 33 and 34. As the number of the circular holes 29 which overlap with the elongate hole 31 increases, the damping force decreases, i.e., the suspension characteristic becomes soft, while as the number of the holes 29 which overlap with the hole 31 decreases, the damping force increases, i.e., the suspension characteristic becomes hard.

Accordingly, changing the suspension characteristic of the vehicle in FIG. 3 in accordance with driving state means controlling the step motor 28 of the actuators 25a to 25d in accordance with driving state.

Figure 6:
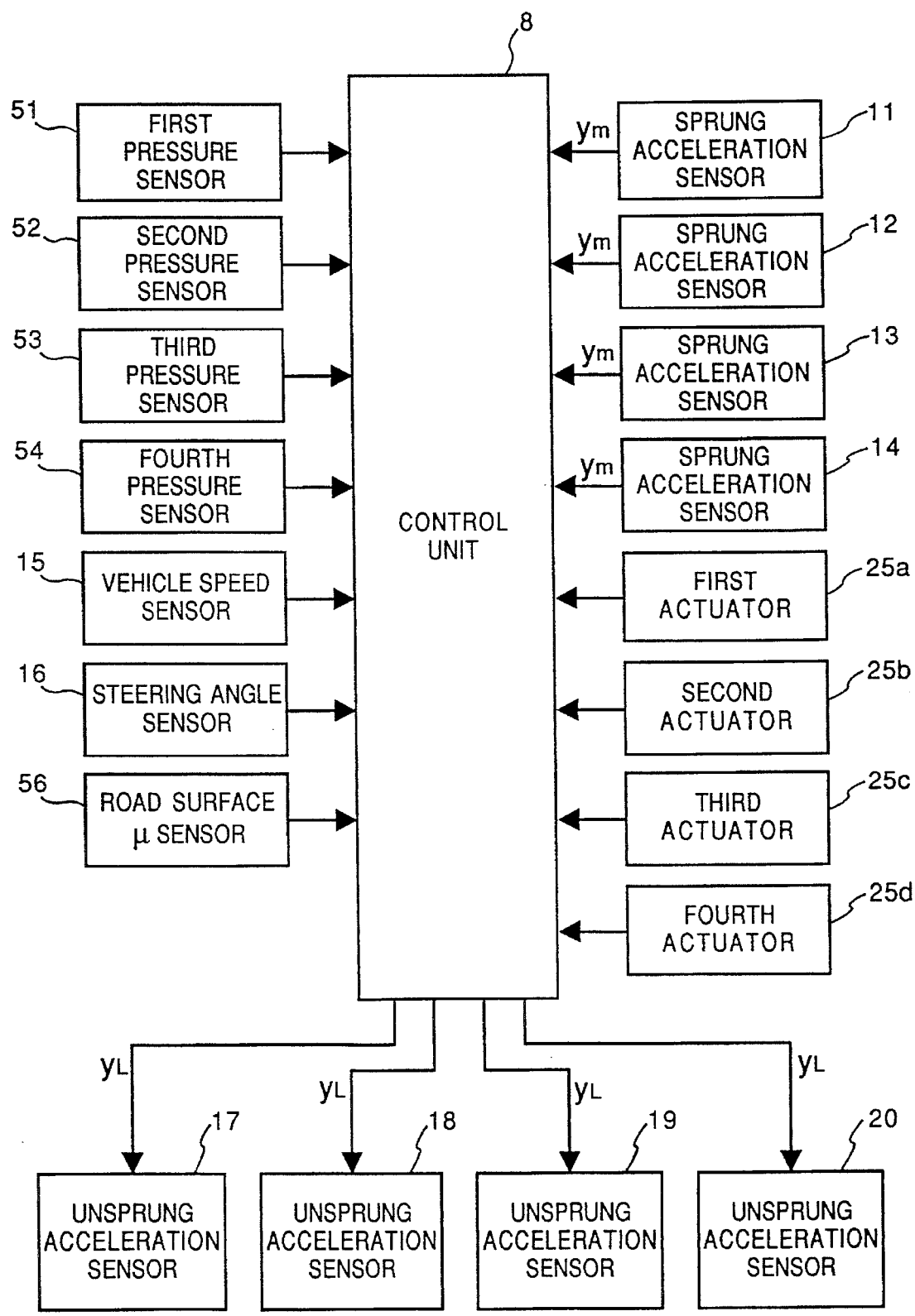
FIG. 6 is a block diagram showing connection between controller 8 of the vehicle in FIG. 3 with various sensors.

FIG. 6 shows the construction of the control system of the suspension apparatus. In FIG. 6, first pressure sensor 51, the acceleration sensor 11 and the first actuator 25a are provided corresponding to the left front wheel 5; second pressure sensor 52, the acceleration sensor 12 and the second actuator 25b, the right front wheel 5; third pressure sensor 53, the acceleration sensor 13 and the third actuator 25c, the left rear wheel 6; and fourth pressure sensor 54, the acceleration sensor 14 and the fourth actuator 25d, the right rear wheel 6. Note that the actuators 25a to 25d correspond to the actuator 25 in FIG. 4, and the pressure sensor 51 to 54 are respectively incorporated in the shock absorbers 1 to 4.

Numerals 15, 16 denote the aforementioned vehicle speed sensor and the steering angle sensor; 56, a road surface µ sensor for detecting a friction coefficient (µ) of the road surface based on a known method, e.g., calculation from a vehicle speed and its differentiation value (vehicle body acceleration). Detection signals from these sensors are all inputted into the control unit 8 which outputs a control signal to the actuators 25a to 25d respectively. The operations of the actuators 25a to 25d based on the control signals respectively change the damper coefficients of the shock absorber 1 to 4.

Control Principle

Next, the control principle for the actuator 25 by the control unit 8 will be described below.

Figure 7:
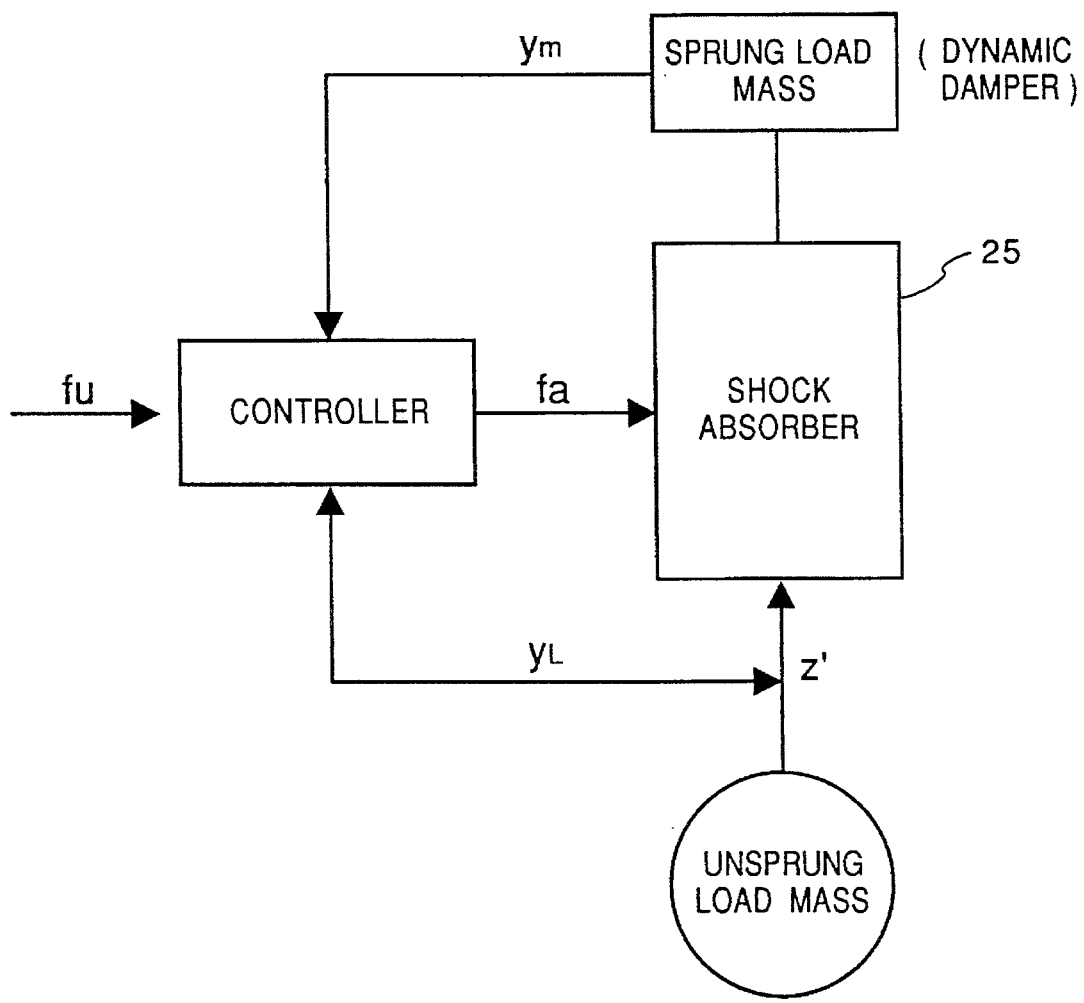
FIG. 7 is a single-wheel model of a suspension system of the embodiment.

FIG. 7 shows a single-wheel model system. Providing that quantity state of the system is denoted by x(k); control force for the actuator 25, by $f_a(k)$; and a road surface input, by $z'_r(k)$, the state quantity x of this single-wheel model is denoted by:

$$x(k+1)=\Phi \cdot x(k)+\Gamma_1 \cdot f_a(k)+\Gamma_2 \cdot z'_r(k) \qquad (1)$$

$\Phi$, $\Gamma_1$ & $\Gamma_2$ are predetermined control gains. k is an argument of discrete time $t_k$. If the sampling period is T, $$t_k = k \cdot T$$

In the feedback control of the sky-hook model system, the control force $f_a(k)$ is:

$$f_a(k)=-G \cdot y_m \qquad (2)$$

G is a control gain which is a designing parameter. $y_m$ is an absolute velocity of the sprung mass denoted by $$y_m = C_m \cdot x(k) \qquad (3)$$

The feedback control in the equation (2) is not employed in the present embodiment. Alternatively, resonance frequency $f_u$ of the unsprung mass is considered as already-known, and the control unit 8 generates a pseudo reference signal $q_r(k)$ as a road surface vibration input corresponding to the resonance frequency $f_u$. $q_r(k)$ may be a sine wave signal which is of 10–12 Hz. Further, the control unit 8 generates a control force $f_a$ to cancel the road surface input corresponding to the pseudo reference signal $q_r(k)$. The control force $f_a$ is superimposed on the $-G \cdot y_m$ in the equation (2). That is, the pseudo reference signal $q_r(k)$ is denoted by:

$$q_r(k)=|q| \cdot \sin(2\pi f_u kT) \qquad (4)$$

Figure 1:
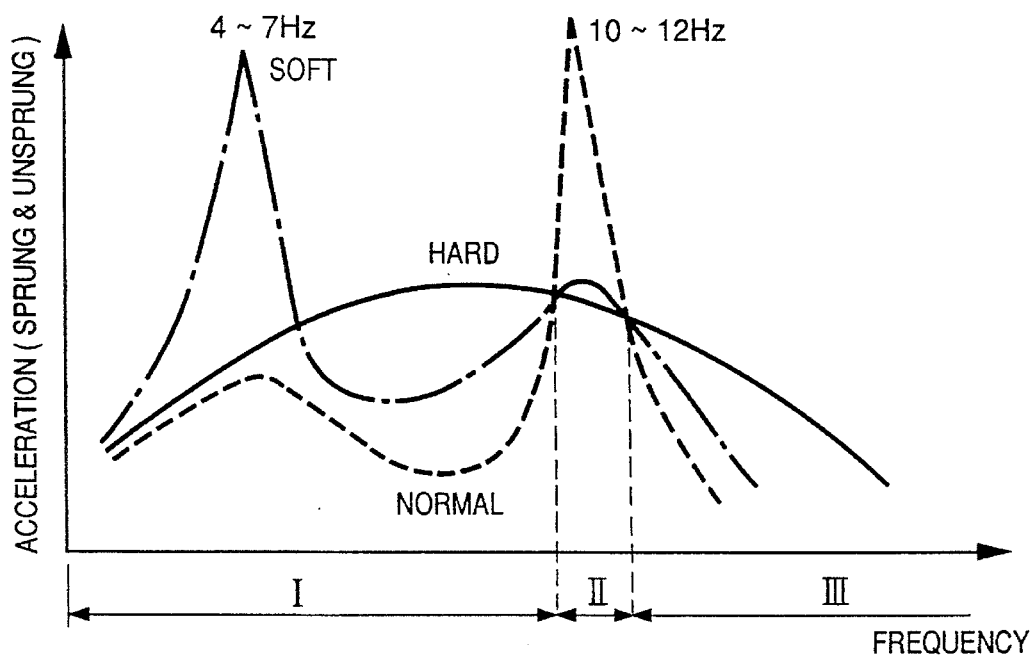
FIG. 1 is a line graph showing the frequency characteristics of a transfer function of acceleration of the sprung/unsprung mass when the shock absorber damping force is varied in the conventional semi-active suspension apparatus.
Figure 2:
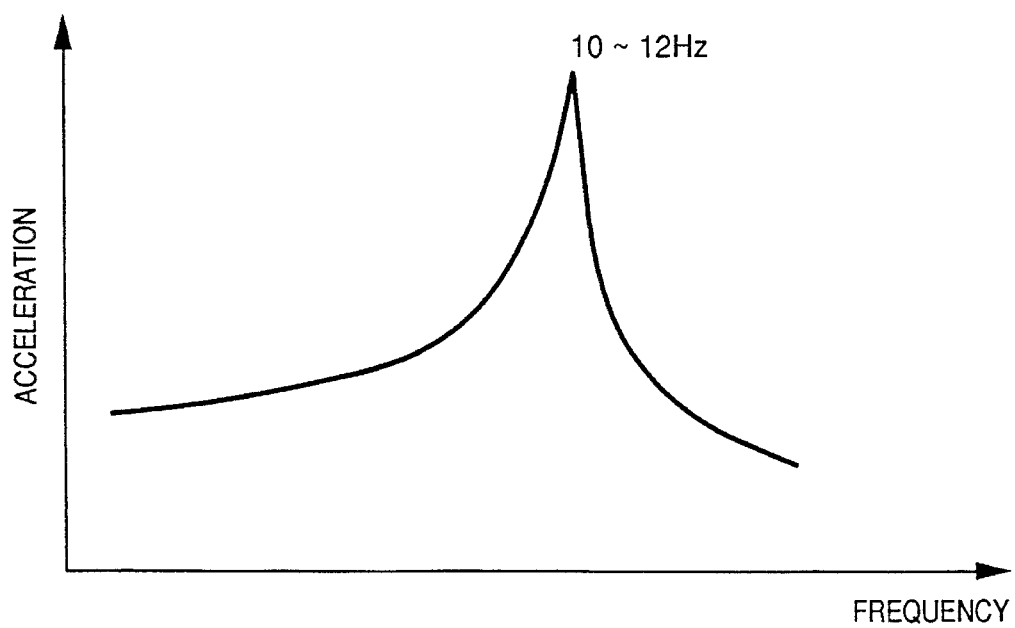
FIG. 2 is a line graph showing the same problem of the conventional semi-active suspension apparatus as that of the full-active suspension apparatus.

$|q|$ is a designing parameter. The unsprung mass resonance frequency $f_u$ corresponds to the frequency of 10–12 Hz described with reference to FIGS. 1 and 2 as the frequency that causes a driver to feel "rattling".

If the absolute velocity of the unsprung mass system is $y_L(k)$, transfer function for converting the $f_a(k)$ to $y_L(k)$ by FIR (finite impulse response) filter construction is:

$$y_L(k)=\Sigma g_i \cdot f_a(k-1) \qquad (5)$$

In equation (5), the unsprung mass is used as an evaluation point, i.e., the unsprung mass is used as a dynamic damper to suppress vibration of the sprung mass. Equation (5) is summed for:

$$i=0 \sim N-1.$$

In FIG. 7, as vibration from the road surface is inputted in the order of 100 Hz, the summation may be performed over about 20 samples. So far as tires of the vehicle are unchanged, other factors such as vehicle weight do not change, therefore, $g_i$ can be experimentally determined. The control force $f_a(k)$ is represented by:

$$f_a(k)=-G \cdot y_m + \Sigma hl q_r(k-l) \qquad (6)$$

Summation of the equation (6) is performed over $l=0 \sim J-1$. In the equation (6), the first term is a feedback control term based on the acceleration signal $y_m$ of the sprung mass by the sky-hook control, and the second term is a feedforward control term based on the pseudo reference signal $q_r(k)$.

hl can be obtained by various methods such as the least square method (LSM). In this method, hl is determined so as to render the contribution of the second term in the equation (6) zero as much as possible. For example, if the ideal control amount corresponding to the pseudo reference signal $q_r(k)$ is $Q_r(k)$, $$Q_r(k)=\Sigma g_i \cdot q_r(k-i) \qquad (7)$$

is obtained from the equation (6). Assuming that vector $\Theta_r(k)$ of $Q_r$ is represented as $$\Theta_r(k)=[Q_r(k), Q_r(k-1), \ldots, Q_r(k-J+1)]^T \qquad (8)$$

and vector H(k) of hl is denoted as $$H(k)=[h_0, hl, \ldots, h_{j-1}]^T \qquad (9)$$

$$H(k+1)=H(k)+2\mu \cdot y_L(k) \cdot \Theta_r(k) \qquad (10)$$

can be obtained. In equation (8), T indicates transposition.

When the resonance frequency $f_u$ of the unsprung mass is determined, the pseudo reference signal $q_r(k)$ is determined from the equation (4). As $g_i$ is experimentally determined, the ideal control amount $Q_r(k)$ can be determined from the equation (7). Then, hl can be determined from the equations (8), (9) and (10), and the control force can be determined from the equation (6). That is, a road surface input is regarded as a pseudo reference signal and based on this pseudo signal, the vibration can be canceled.

Figure 8:
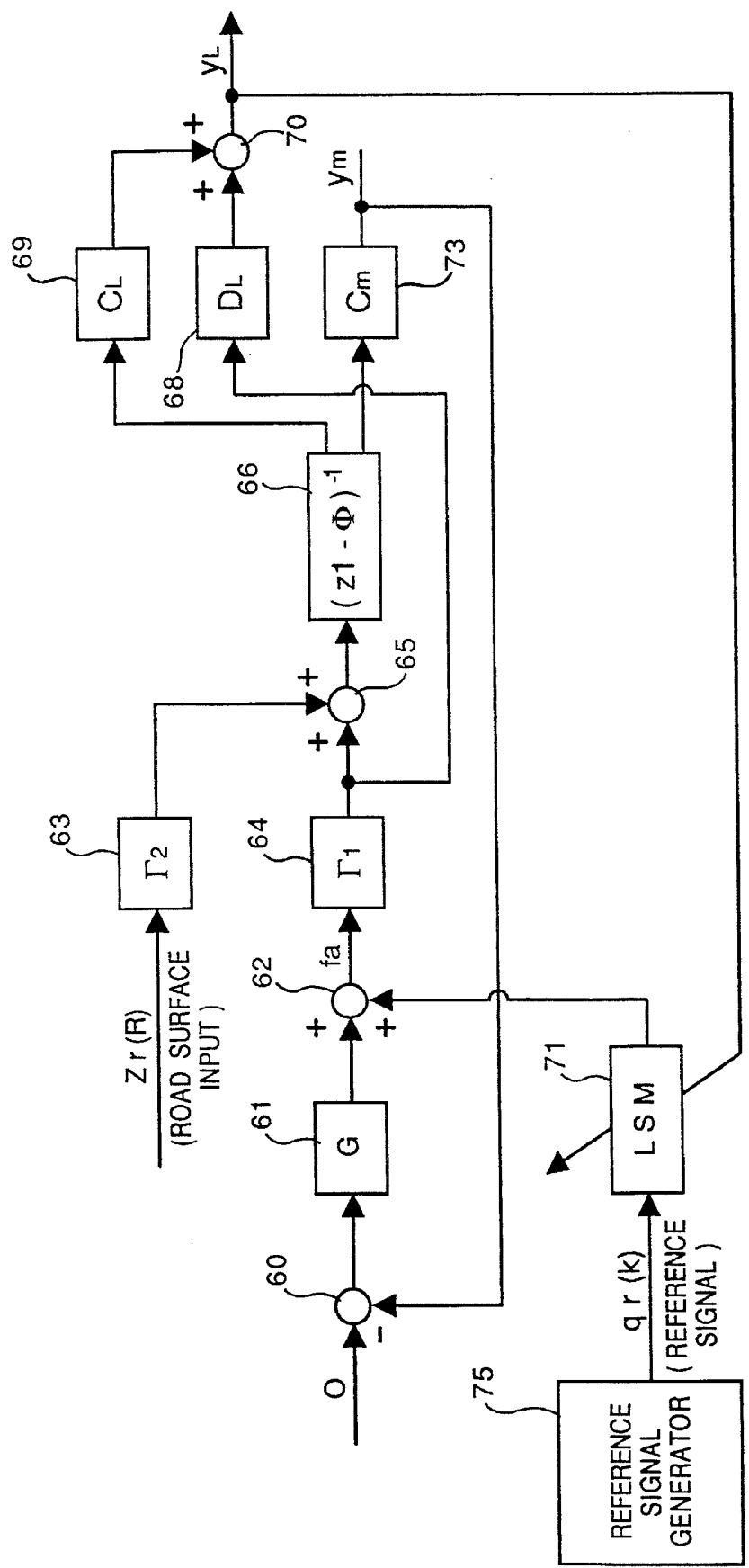
FIG. 8 is a block diagram showing control principle of the embodiment.

FIG. 8 shows equivalence circuits set for the system in accordance with the above control principle. The system comprises a passage for feedback-controlling the sprung mass acceleration signal $y_m$ and a passage for introducing the unsprung mass acceleration signal $y_L$ into tuning circuit 71 to tune gain of the abovementioned FIR filter. In this system, tuning is performed in the circuit 71 so as to cancel the road surface input $y_m$ close to a reference frequency (around 10–12 Hz). As a result, the sprung mass acts as a dynamic damper upon the road surface input $y_m$ close to the reference frequency (around 10–12 Hz), however, frequency bands other than the reference frequency band do not receive the contribution of the second term in the equation (6). That is, output from the tuning circuit 71 to adder 62 becomes almost zero, and normal sky-hook control is performed. Though the sprung mass acts as a dynamic damper, the unsprung mass exceeds the sprung mass in mass, and therefore excessive resonance does not occur.

Modifications

Various modifications to the present embodiment can be made within the scope of the invention.

First Modification

In the above embodiment, the present invention is applied to a suspension apparatus using a shock absorber, however, the present invention is applicable to a full-active suspension apparatus using a hydraulic control for sprung mass and unsprung mass, and to a semi-active suspension apparatus using a hydraulic-cylinder control for a low-speed road surface input and a shock absorber for a high-speed road surface input.

Figure 9:
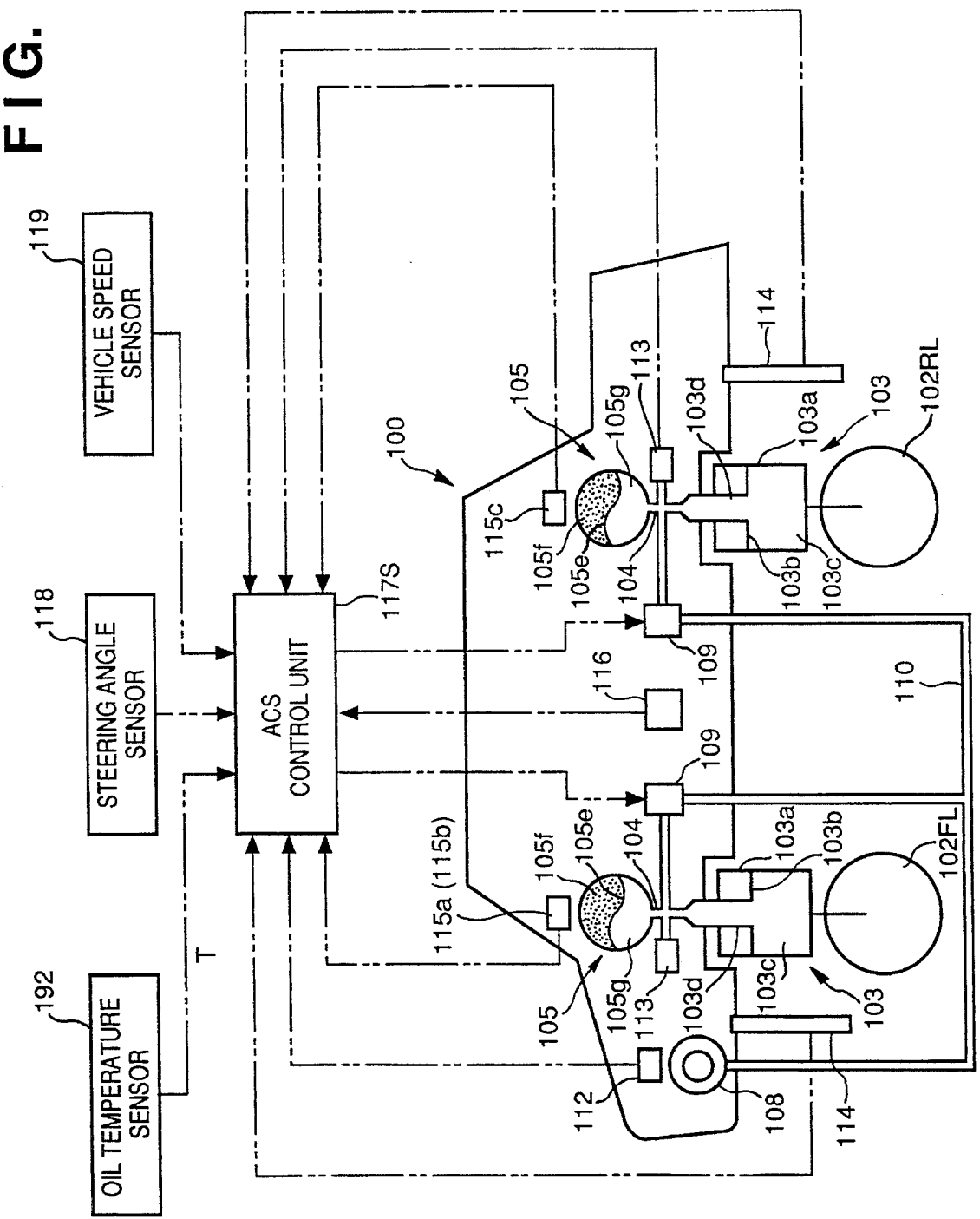
FIG. 9 is a block diagram showing the configuration of a full-active suspension apparatus used in a modification to the embodiment.

FIG. 9 shows the configuration of a suspension system where the present invention is applied to a full- active-suspension apparatus.

Though FIG. 9 shows only the left side of vehicle body 100, the right vehicle body side has a similar construction. In FIG. 9, hydraulic cylinder 103 is arranged between the vehicle body 100 and left front wheel 102FL and between the vehicle body 100 and left rear wheel 102RL. The cylinder 103 includes hydraulic chamber 103c formed by piston 103b inserted into cylinder main body 103a. Piston rod 103d connected to the piston 103b has an upper end connected to the vehicle body 100, and the cylinder main body 103a is connected to the left front wheel 102FL or the left rear wheel 102RL.

The hydraulic chamber 103c of the respective hydraulic cylinder 103 is connected to pneumatic spring 105 via connecting path 104. The pneumatic spring 105 is divided by diaphragm 105e into gas chamber 105f and hydraulic chamber 105g. The hydraulic chamber 105g is connected to the hydraulic chamber 103c of the hydraulic cylinder 103 via the connecting path 104 and the piston 103b of the hydraulic cylinder 103. Proportional flow control valve 109 for controlling flow amount of the fluid supplied to the hydraulic cylinder 103 and flow amount discharged from the hydraulic cylinder 103 is provided upon fluid passage 110 which connects hydraulic pump 108 and the hydraulic cylinder 103 in a fluid-conveyable status.

The hydraulic pump 108 has discharging pressure sensor 112 for detecting discharging pressure of the fluid, and the respective hydraulic cylinder 103 have hydraulic pressure sensor 113 for detecting a hydraulic pressure within the hydraulic chamber 103c.

Further, vehicle height displacement sensors 114 are respectively provided for detecting a cylinder stroke amount of the respective cylinders 103 and detecting displacement of the vehicle body in a vertical direction with respect to the respective wheels 102FL and 102RL and detecting vehicle height displacement. Vertical acceleration sensors 115a to 115c for detecting acceleration of the vehicle in the vertical direction, i.e., acceleration of the sprung mass in the vertical direction of the wheels 102FL and 102RL are provided on a substantially horizontal surface of the vehicle. More specifically, the vertical acceleration sensors 115a and 115b are arranged above the right and left front wheels 102FR and 102FL, respectively, and the vertical acceleration sensor 115c is arranged at the central position in the vehicle width direction above the right and left rear wheels. Lateral acceleration sensor 116 for detecting lateral acceleration acts in the vehicle lateral direction, at a position of the center of gravity, further, steering angle sensor 118 and vehicle speed sensor 119 are provided there. Numeral 192 denotes a sensor for detecting oil temperature T.

Detection signals from the discharging pressure sensor 112, the hydraulic pressure sensors 113, the vehicle height displacement sensors 114, the vertical acceleration sensors 115a to 115c, the lateral acceleration sensor 116, the steering angle sensor 118 and the vehicle speed sensor 119 are inputted into control unit 117S including a CPU. The control unit 117S performs calculations based on these detection signals in accordance with a predetermined program to control the proportional flow control valves 109 for desired variable control of the suspension characteristic.

The present invention can be applied to a full-active suspension by controlling a flow control signal to the hydraulic cylinder 103 with the system shown in FIG. 8. In the full-active suspension apparatus, the flow control signal can be controlled more positively than in the system using the shock absorber in FIG. 3, the present invention can be more effectively employed.

Second Modification

In the previous embodiment, the tuning circuit 71 always works. However, the vibration of around 10–12 Hz causes a "rattling" problem under certain driving conditions.

Figure 10:
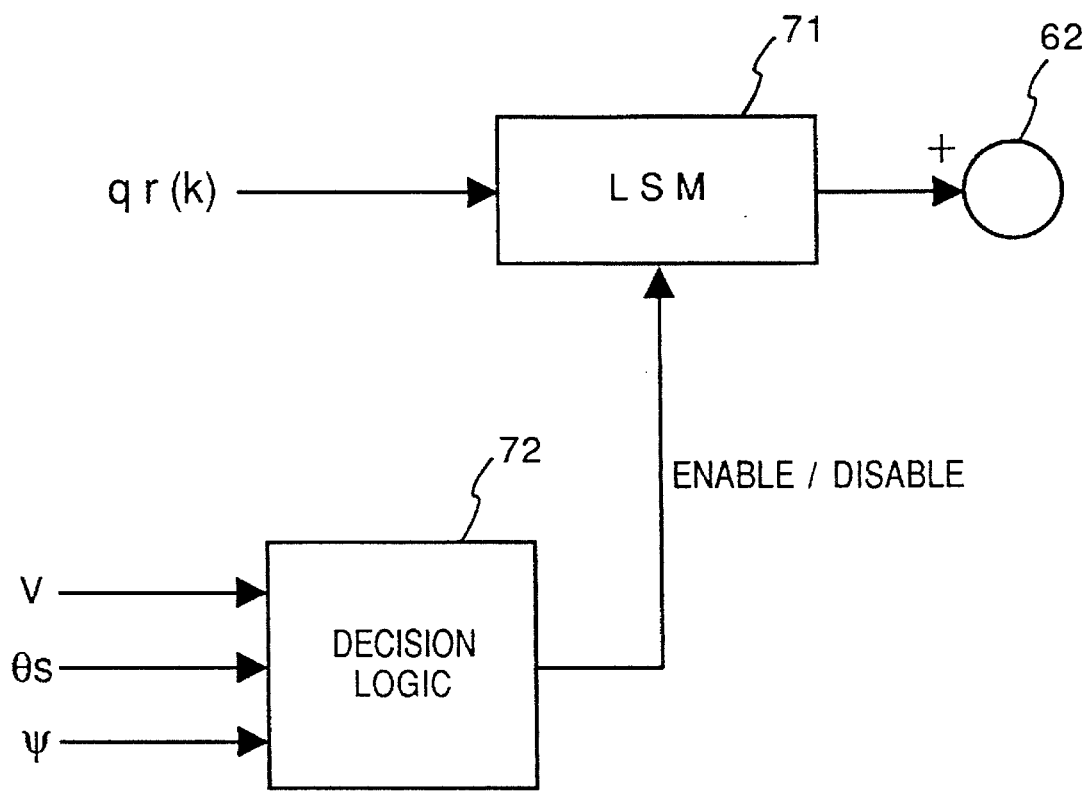
FIG. 10 is a block diagram showing another modification to the embodiment.

The second modification may be proposed as shown in FIG. 10. In this modification, the system comprises decision circuit 72 for enabling or disabling the tuning circuit 72. The decision circuit 72 receives steering angle signal $\theta_s$ and yaw rate signal $\phi$, and only when it judges that the vehicle speed is high, or it judges based on the steering angle signal $\theta_s$ that marginal handling has been made, otherwise, if it judges based on the yaw rate signal $\phi$ that the vehicle body has turned, the decision circuit 72 outputs an enable signal to the tuning circuit 71. The tuning circuit 71 outputs a signal to the adder 62 only when it receives the enable signal. Under driving condition where the driver does not feel "rattling", i.e., the vehicle speed is not high, the handling is smooth and the vehicle body is not turning, the system does not perform the above control. In this manner, the control is more efficient.

As many apparently widely different embodiments of the present invention can be made without departing from the spirit and scope thereof, it is to be understood that the invention is not limited to the specific embodiments thereof except as defined in the appended claims.

What is claimed is:

1. A suspension apparatus of a vehicle having a shock damping unit provided between sprung mass and unsprung mass of the vehicle to vary a suspension characteristic, comprising:

generating means for generating a reference signal corresponding to vibration from a road surface, said vibration being within an intermediate range of frequencies at which a resonance of the unsprung mass is induced;

feedback control means for feedbacking a driving state signal indicative of a driving state of a vehicle to the shock damping unit, the feedback control means being enabled outside the intermediate range of frequencies;

filter means for receiving and filtering the reference signal and the driving state signal; and feedforward control means for feedforwarding an output signal from the filter means to the shock damping unit so as to minimize the vibration corresponding to the reference signal.

2. The apparatus according to claim 1, wherein the driving state signal is a vehicle height acceleration signal, and wherein the feedback control means inputs the acceleration signal and generates a control signal which is of opposite-phase to the acceleration signal, and an output signal from said feedforward control means is overlapped with an output from said feedback control means.

3. The apparatus according to claim 1, wherein the reference signal is a periodic signal.

4. The apparatus according to claim 3, wherein the periodic signal is a sine wave.

5. The apparatus according to claim 3, wherein the periodic signal is of 10 to 12 Hz.

6. The apparatus according to claim 1, wherein operation of said filter means is controlled by the input driving state signal.

7. The apparatus according to claim 1, wherein the shock damping unit has a hydraulic cylinder and a control circuit for controlling hydraulic pressure amount supplied to the hydraulic cylinder.

8. The apparatus according to claim 1, wherein the shock damping unit comprises a fluid cylinder and a member for controlling resistance of a fluid which flows in the cylinder.

9. The apparatus according to claim 1, wherein said filter means has a circuit for inputting an unsprung mass velocity signal and the reference signal and generating a tuning signal, and said feedforward control means receives the tuning signal and a sprung mass velocity signal and performs feedforward control so as to cancel sprung mass velocity component.

10. A suspension apparatus that feedbacks a driving state signal indicative of a driving state of a vehicle to a shock damping unit provided between sprung mass and unsprung mass of the vehicle to vary a suspension characteristic, comprising:

generation means for generating a reference signal corresponding to vibration from a road surface which induces resonance of the unsprung mass;

filter means for inputting the reference signal and the driving state signal, the operation of said filter means being controlled in accordance with the input driving state signal;

feedforward control means for feedforwarding an output signal from the filter means to the shock damping unit so as to minimize the vibration corresponding to the reference signal; and prohibition means for prohibiting operation of said feedforward control means when the driving state signal indicates a predetermined condition.

11. The apparatus according to claim 10, wherein the driving state signal is a vehicle height acceleration signal, and wherein the suspension apparatus further comprises feedback control means for inputting the acceleration signal and generating a control signal which is of opposite-phase to the acceleration signal, and an output signal from said feedforward control means is overlapped with an output from said feedback control means.

12. The apparatus according to claim 10, wherein the reference signal is a periodic signal.

13. The apparatus according to claim 12, wherein the periodic signal is a sine wave.

14. The apparatus according to claim 12, wherein the periodic signal is of 10 to 12 Hz.

15. The apparatus according to claim 10, wherein the shock damping unit has a hydraulic cylinder and a control circuit for controlling a hydraulic pressure amount supplied to the hydraulic cylinder.

16. The apparatus according to claim 10, wherein the shock damping unit comprises a fluid cylinder and a member for controlling resistance of a fluid which flows in the cylinder.

17. The apparatus according to claim 10, wherein said filter means has a circuit for inputting an unsprung mass velocity signal and the reference signal and generating a tuning signal, and said feedforward control means receives the tuning signal and a sprung mass velocity signal and performs feedforward control so as to cancel sprung mass velocity component.

\* \* \* \* \*